May 17, 1932. J. GERIN 1,858,924
WING SURFACE WITH AUTOMATICALLY VARIABLE CURVATURE
Filed Jan. 14, 1931
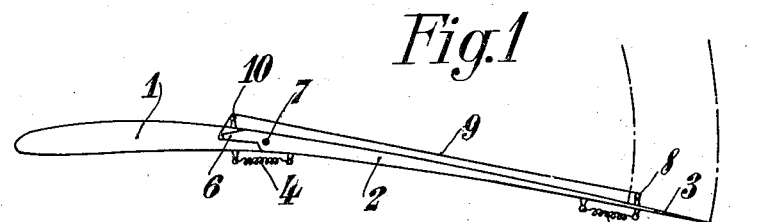
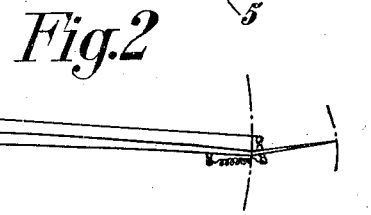
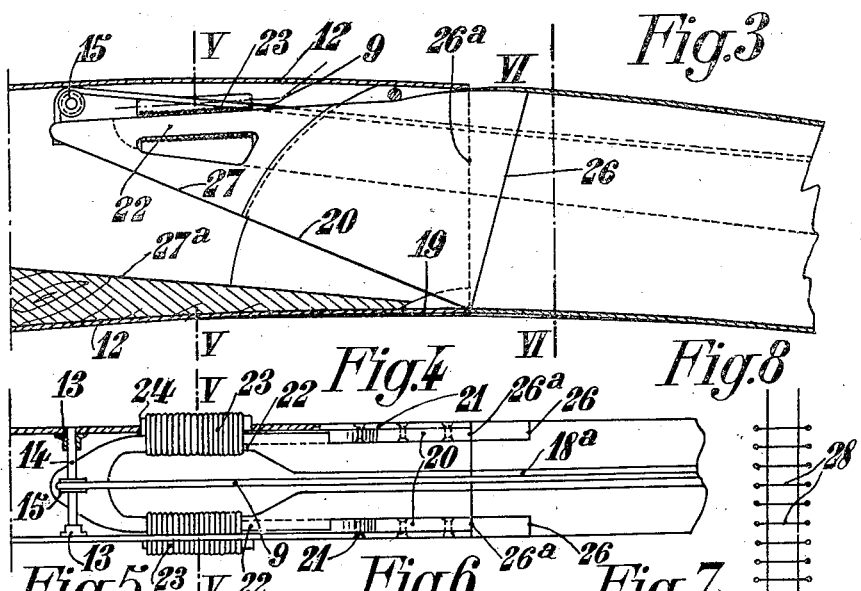
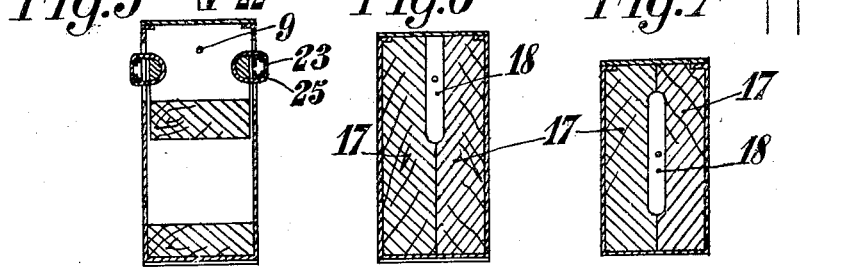
J. Gerin INVENTOR
BY Maats Ellen ATTYS.

Patented May 17, 1932

1,858,924

UNITED STATES PATENT OFFICE

JACQUES GERIN, OF LEVALLOIS-PERRET, FRANCE

WING SURFACE WITH AUTOMATICALLY VARIABLE CURVATURE

Application filed January 14, 1931, Serial No. 508,743, and in France January 21, 1930.

The present invention has for its object a wing surface such, in particular, as an aeroplane wing, the curvature of which automatically varies with the speed of the aeroplane, so as to automatically maintain, during flight, the conditions of longitudinal stability, by displacement of the centres of thrust according to the speed.

A wing surface according to the invention can automatically pass from a hollow profile having a simple curvature, the centre of thrust of which is displaced well rearward for an increasing speed and small angles of incidence, to a profile of double curvature, of less lifting power, but the centre of thrust of which is displaced well forward, in the same conditions.

This change of profile, which automatically takes place as soon as the speed of the aeroplane increases, has for advantage or industrial result of limiting to a value inferior to the critical or dangerous value the torsional or twisting torque exerted on the spars of the wing. This advantage is of quite particular importance in the case of a wing having a single front spar.

For the above purpose, the wing surface forming the subject matter of the invention, is mainly characterized by the combination, with a fixed surface carrying the leading edge, of at least, two movable surfaces jointed together from place to place from the fixed surface, of resilient means for causing the movable surfaces to come in position for obtaining the profile having the highest lifting power, and of a non-extensible funicular connection between the fixed surface and at least one of the movable surfaces, so that the increasing thrust of the air automatically effects the transformation of the simple hollow profile having a double curvature.

Such as defined in its principle, the invention can be carried out according to various forms of construction which can differ from each other particularly:

By the number of the movable surfaces. It seems actually preferable to limit this number to two, the thrust being exerted on the first surface, that is to say, that which is jointed to the fixed surface. It seems advantageous to adopt for this first surface, a depth of about 50% of the total depth of the wing, whilst the second movable surface carrying the trailing edge has a depth representing only 10% of the total depth. This latter surface responds to the action of the funicular connection for causing the double curvature to appear.

By the resilient returning means for the movable surfaces. A convenient form of construction of these means consists in connecting the movable surfaces together and with the fixed surface by means of flexible flange plates arranged on the intrados face of the ribs of the surfaces. This blade, which constitutes a hinge, can, to a certain extent, also constitute a resilient returning member for the surfaces, but this return movement is particularly obtained by connections of the Sandow type interposed between the ends of the ribs having a relative movement.

By the funicular connection adopted this connection can, particularly and preferably, be constituted by a non-extensible cable arranged in the plane common to three ribs of the fixed and movable surfaces, respectively, and connecting a point of the fixed surface to a point of the rear or trailing movable surface, constantly remaining placed between the coverings of the surfaces, so as to eliminate any prejudicious aerodynamic resistance.

The invention also relates by way of detail objects constituent of the main object—

To the combination, with the resilient means for returning the movable surfaces in position for obtaining a hollow profile having a maximum lifting power, of damping devices, for instance of friction damping devices, for avoiding the vibrations or floating of the movable surfaces and, particularly, of the trailing surface. A simple form of construction of these damping devices consists in devising the ribs near their joint so that they present relatively movable contact surfaces provided with linings having a high friction coefficient.

To the provision of slotted wings, the slots being obtained by interruptions between the supple coverings, made of cloth or canvas for instance, of the surfaces, opposite the joints, the edges of these interruptions being braced by flexible bonds, so that the slots are closed or simply restricted when the profile has a double curvature.

The invention is applicable to any aeroplane lifting surfaces, whatever may be the type of the same. Its application is particularly advantageous to the aeroplanes with a variable lifting surface having formed the subject matter of the U. S. A. Patent application No. 322,941, dated November 30th 1928, in the name of the applicant. In these aeroplanes, the fixed surface usually has only a single spar which, when the lifting surface is maximum is liable to be subjected to very important torsional or twisting torques.

The accompanying drawings illustate by way of example only, a form of construction of an aeroplane wing according to the invention.

Figs. 1 and 2 are diagrammatic views of an aeroplane wing, showing, in side view, this wing with a simple and double curvature, respectively.

Fig. 3 is a side view, with partial section, of a connecting device between a rib of the fixed surface and a rib of the adjacent movable surface.

Fig. 4 is a corresponding plan view.

Figs. 5 and 6 are cross sections made according to lines V—V and VI—VI of Figs. 3 and 4.

Fig. 7 is a view similar to Fig. 6, but for a region of the rib at the rear of the line VI—VI of Fig. 3.

Fig. 8 is a plan view showing the bracing of the edges of the supple covering of a slotted wing.

In the diagrammatic views of Figs. 1 and 2 which show a wing having two movable surfaces, 1 designates the fixed part, having a constant incidence, and provided with one or more spars and transverse ribs. 2 and 3 are the two movable surfaces. Each rib of the surface 2 is jointed to a fixed rib of the surface 1 and a rib of the surface 3 is jointed to the adjacent rib of the surface 2. Consequently, each rib of the wing surface (wing for instance) may be considered as a rib in three parts; a first part or fixed front part, a middle part jointed to the first one, and a rear or trailing part jointed on the middle part.

Resilient returning members diagrammatically illustrated in the form of springs 4 and 5 connect per pair the rib parts for returning the latter in the positions determining the profile having a simple curvature, such as that shown in Fig. 1.

Each rib of the surface 2 is provided with a lever arm 6 in front of its pivot 7, whilst the corresponding rib of the trailing part 3 is also provided with a lever arm 8. A non-extensible cable 9 connects the lever arms 6 and 8 and passes over a small pulley 10 of the fixed part 1, so that if in antagonism with the reaction of the spring 4, the thrust of the air on the part 2 brings the latter in the position of Fig. 2, the entire wing assumes the profile having a double curvature, as shown.

By way of example, the device which has just been described can be practically carried out. With the principle such as shown in Figs. 3 to 7, the ribs can be made of wood, metal, or both of wood and metal.

In the example illustrated, the rib of the fixed part 1 has, at its rear portion, two side cheek members, preferably made of metal, or of wood and reinforced by metal plates and two upper and lower flange plates 12. Within the box thus obtained, bearing portions 13 are secured by means of rivets or otherwise, these bearing portions supporting the spindle 14 of a guide roller 15.

The rib of the movable part 2 is, in the example under consideration, made of wood by juxtaposition and gluing of two cheek members 17 recessed at 18 on the major portion of their length. The mutual jointing of the two ribs of the parts 1 and 2, is effected by a flexible and preferably resilient flange plate 19, made of steel for instance, riveted on the lower flange plates of both ribs. The adjacent ends of both ribs fit into each other and friction linings 20 are laterally secured on the cheek members 21 and rub against the side faces of the rib of the part 1, for constituting friction damping devices, for the purpose indicated above. At its front portion, the rib of the part 2 is so shaped as to form a yoke, preferably reinforced by metal parts. The side branches 22 of this yoke are connected, by sandows 23, or rubber cords, to branches 24 secured on the inner faces of the cheek members 21 of the rib of the part 2, or obtained as illustrated by depressing these cheek members and bending down the edges 25 (Fig. 5). The sandows ensure the resilient return in position of the wing surface, so that the latter presents a profile having a simple curvature, as shown in Fig. 1.

At the front of the yoke is attached, in any suitable manner, one of the ends of the cable 9 of Figs. 1 and 2; the cable passes over the guide pulley 15 and, through the groove 18$^a$ and the openings 18 of the rib of the part 2, it extends up to the trailing part 3, the connection of which with the part 2 is substantially effected as just described for the parts 1 and 2. For this reason, it has not been considered necessary to particularly illustrate this connection.

It will be seen that all the members of the device are within the wing and, from this fact, do not offer any prejudicious aerodynamic resistance.

When the aerodynamic stresses exerted on the wing are small, the wing according to this invention presents a simple curvature (Fig. 1) and is ready to be subjected to important distortions. When these stresses increase, the sandows 23 are stretched and the wing assumes a simple reduced curvature, and then a double curvature. When these stresses reach a certain value, the faces 26 and 27 of the rib of the part 2 take a bearing on the faces 26ª and 27ª of the rib of the part 1. The same effect takes place at the joint of the trailing part 3. In these conditions, the three parts of one and the same rib mutually lock for constituting a rigid rib in which the sandows 23 no longer intervene.

It is to be noted that each rib constituted an independent system which, if it presents any eventual defect, does not prevent the operation of the adjacent ribs.

The operation of the mechanism described is entirely automatic and this mechanism is not provided with any lever arms or members located outside the wing surface. As it is independent of the pilot, it does not necessitate any distant control and, consequently, is free of the well known risks of such controls.

The covering of the surfaces is, at least when the invention is applied to variable surfaces aeroplanes forming the subject matter of the U. S. A. Patent application No. 322,941, dated November 30th, 1928, in the name of the applicant, made in such a way as to be supple and distortable. In this case, it is made for instance of canvas and divided opposite the joint 19, into two parts, for forming a slotted wing.

In order that the opposite edges of the covering, at the slot, when the wing has a profile forming a hollow curve (Fig. 1), would not sag at their middle point between two ribs, these edges are braced by supple bonds 28 (Fig. 8). These bonds are preferably non-extensible, but they can also be resilient. They constitute a lacing passing through eyelets provided on the edges to be braced.

What I claim as my invention and desire to secure by Letters Patent is:

1. In a wing surface having an automatically variable curvature, a fixed part comprising the leading edge of the surface, a second part articulated to the rear edge of the first part and a third part articulated to the rear edge of the said second part, resilient means interposed between the first and second parts on the one hand and the second and third parts on the other hand for returning the said parts to the maximum position of curvature of the whole of the wing surface, inextensible cables interposed between the second and third parts in such a manner that starting with a predetermined pressure on the second part of the whole of the wing surface assumes a double curvature of very slight bearing power.

2. In an aeroplane wing having an automatically variable surface, ribs in three parts, a first part belonging to a front element of the wing and two other parts articulated together and to the first part and covered on their two faces with walls constituting the covering of the wing, resiliently distortable members interposed on the one hand between the first and second parts and on the other hand between the second and third parts of each rib for returning them to the maximum position of simple curvature of the whole of the wing, an inextensible supple cable interposed between the second and third parts of each rib in such a manner that starting with a predetermined pressure on the second part the whole of the wing assumes a double curvature of very slight bearing power.

3. In an aeroplane wing according to claim 1, a rib in three parts, a fixed first part hollowed out in its rear portion for receiving the end of a second part, an elastic blade for connecting with a hinge the second part to the first part, sandows interposed between the said first and second parts, friction linings on the first part for braking the movements of the second part relative thereto, a third rib part articulated to the second and returned resiliently like the second part to the first part, an inextensible cable stretched between the front ends of the second and the third part and arranged in an axial groove of the second part.

In testimony whereof I have signed this specification.

JACQUES GERIN.